US012415197B2

(12) United States Patent
Fujimoto

(10) Patent No.: US 12,415,197 B2
(45) Date of Patent: Sep. 16, 2025

(54) LIQUID DISPENSER WITH PLUNGER

(71) Applicant: Iwashita Engineering, Inc., Tokyo (JP)

(72) Inventor: Shinya Fujimoto, Kitakyusyu (JP)

( * ) Notice: Subject to any disclaimer, the term of this patent is extended or adjusted under 35 U.S.C. 154(b) by 443 days.

(21) Appl. No.: 18/152,759

(22) Filed: Jan. 11, 2023

(65) Prior Publication Data

US 2023/0158526 A1 May 25, 2023

Related U.S. Application Data

(63) Continuation of application No. PCT/JP2021/026160, filed on Jul. 12, 2021.

(30) Foreign Application Priority Data

Jul. 14, 2020 (JP) ................................ 2020-120737
Jul. 14, 2020 (JP) ................................ 2020-120741

(51) Int. Cl.
*B05B 9/00* (2006.01)
*B05B 9/04* (2006.01)
(Continued)

(52) U.S. Cl.
CPC ............ *B05B 9/047* (2013.01); *B05B 9/0403* (2013.01); *B05B 12/006* (2013.01)

(58) Field of Classification Search
CPC ..... B05B 9/047; B05B 9/0403; B05B 12/006; B05B 9/04; B05B 9/0409; B05C 5/00;
(Continued)

(56) References Cited

U.S. PATENT DOCUMENTS 6,178,935 B1 1/2001 Diehl et al.
6,467,655 B1 10/2002 Ogawa
(Continued)

FOREIGN PATENT DOCUMENTS

CN 111068984 4/2020
JP 2002-518624 6/2002
(Continued)

OTHER PUBLICATIONS

International Search Report dated Aug. 31, 2021 for PCT/JP2021/026160.
(Continued)

*Primary Examiner* — Vishal Pancholi
(74) *Attorney, Agent, or Firm* — SOEI PATENT & LAW FIRM

(57) ABSTRACT

A dispenser includes: a plunger; a dispensing portion configured to dispense and suction liquid in response to an advance and a retraction of a distal end surface of the plunger along an axial line. The dispensing portion includes: a surrounding portion surrounding the distal end surface of the plunger about the axial line to define an accommodation chamber for accommodate the liquid to be dispensed; and an end portion facing the distal end surface of the plunger. The surrounding portion includes an inlet opening into the accommodation chamber to receive the liquid into the accommodation chamber. A distance from the inlet to the end portion is less than or equal to half of a maximum stroke of the distal end surface of the plunger.

20 Claims, 12 Drawing Sheets

(51) Int. Cl.
*B05B 9/047* (2006.01)
*B05B 12/00* (2018.01)

(58) Field of Classification Search
CPC .. B05C 11/10; F04B 9/08; F04B 13/00; F04B 53/16
See application file for complete search history.

(56) References Cited

U.S. PATENT DOCUMENTS

| | | | | |
|---|---|---|---|---|
| 7,815,422 | B2 * | 10/2010 | Ogawa | F04B 13/00 417/415 |
| 8,322,575 | B2 * | 12/2012 | Riney | B05C 5/001 251/62 |
| 8,616,525 | B2 * | 12/2013 | Franz | F16K 41/12 251/368 |
| 2004/0035886 | A1 * | 2/2004 | Cordomi | B01F 35/8822 222/321.9 |
| 2014/0127062 | A1 * | 5/2014 | Buckley | F04B 53/16 417/439 |
| 2016/0368016 | A1 | 12/2016 | Groene et al. | |

FOREIGN PATENT DOCUMENTS

| | | |
|---|---|---|
| JP | 2009-154064 | 7/2009 |
| JP | 2014-163372 | 9/2014 |
| JP | 2017-506578 | 3/2017 |
| KR | 1020120079334 | 7/2012 |
| WO | 99/066177 | 12/1999 |
| WO | 2015/126693 | 8/2015 |

OTHER PUBLICATIONS

International Preliminary Report on Patentability with Written Opinion dated Jan. 26, 2023 for PCT/JP2021/026160.

* cited by examiner

LIQUID DISPENSER WITH PLUNGER

CROSS-REFERENCE TO RELATED APPLICATIONS

This application is a continuation application of PCT Application No. PCT/JP2021/026160, filed on Jul. 12, 2021, which claims the benefit of priority from Japanese Patent Application No. 2020-120737, filed on Jul. 14, 2020, and Japanese Patent Application No. 2020-120741, filed on Jul. 14, 2020. The entire contents of the above listed PCT and priority applications are incorporated herein by reference.

BACKGROUND

Field

The present disclosure relates to a liquid dispenser.

Description of the Related Art

Japanese Unexamined Patent Application Publication No. 2014-163372 discloses a liquid dispense valve that dispenses a predetermined amount of liquid from a tip nozzle by reciprocally driving a plunger from above with respect to the pressurized liquid introduced into a liquid reservoir and a plunger guide. The liquid dispense valve has a connection portion between the plunger and a sliding body of a plunger driver so that a sliding direction of the plunger is not affected even if a sliding direction of the plunger driver is deviated from a sliding direction of the plunger.

SUMMARY

Disclosed herein is A dispenser. The dispenser may include: a plunger comprising a distal end surface facing an advance direction of the plunger and a proximal end surface facing a retraction direction of the plunger; a dispensing portion configured to dispense and suction liquid in response to an advance and a retraction of the distal end surface along an axial line intersecting the distal end surface and the proximal end surface, wherein the dispensing portion comprises: a surrounding portion surrounding the distal end surface of the plunger about the axial line to define an accommodation chamber; and an end portion facing the distal end surface of the plunger along the axial line, wherein the end portion comprises an outlet opening into the accommodation chamber to dispense the liquid out of the accommodation chamber, wherein the surrounding portion comprises an inlet opening into the accommodation chamber to receive the liquid into the accommodation chamber, and wherein a distance from the inlet to the end portion is less than or equal to half of a maximum stroke of the distal end surface of the plunger.

DETAILED DESCRIPTION

In the following description, with reference to the drawings, the same reference numbers are assigned to the same components or to similar components having the same function, and overlapping description is omitted.

[Dispenser]

Figure 1:
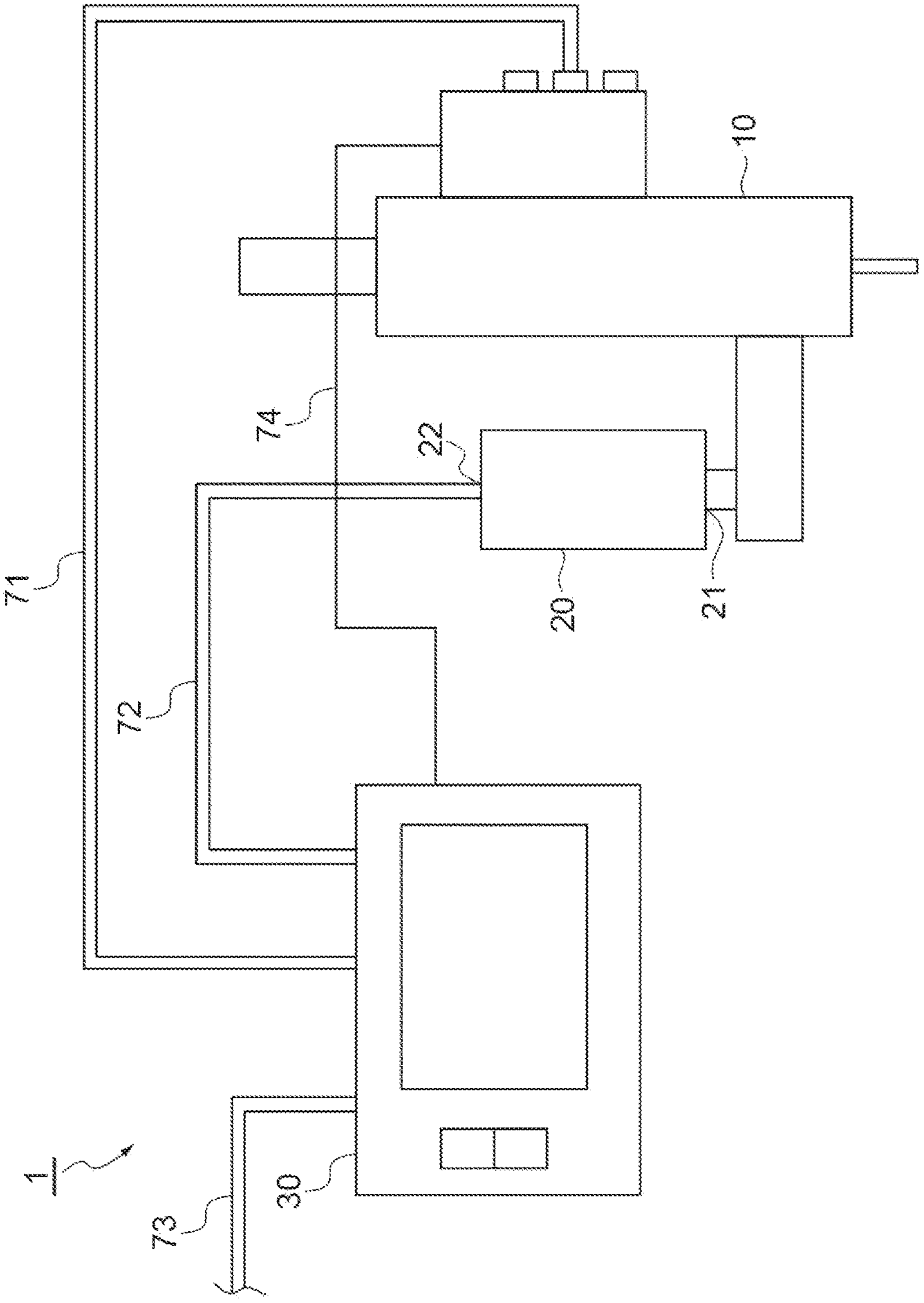
FIG. 1 is a schematic diagram illustrating an example configuration of a dispenser.

A dispenser 1 shown in FIG. 1 is a device for intermittently dispensing liquid. For example, the dispenser 1 is a jet-type dispenser that intermittently ejects droplets toward a remote application target. Examples of the dispensed liquid include adhesives, lubricants, solder pastes, fluxes, silver pastes, reagents, and the like.

The dispenser 1 has a pump unit 10, a barrel 20, and a controller 30. The pump unit 10 reciprocates a plunger by pressurizing the plunger by gas (hereinafter referred to as "driving gas"). Thus, suction and dispense of the liquid are repeated. The pump unit 10 reciprocates the plunger by switching the supply direction of the driving gas with respect to the plunger by driving power. The barrel 20 pressurizes liquid by gas (hereinafter referred to as "pumping gas") to supply the liquid to the pump unit 10. The controller 30 supplies the driving gas and the driving power to the pump unit 10, and supplies the pumping gas to the barrel 20. Hereinafter, configurations of the pump unit 10, the barrel 20, and the controller 30 will be described in detail.

(Pump Unit)

Figure 2:
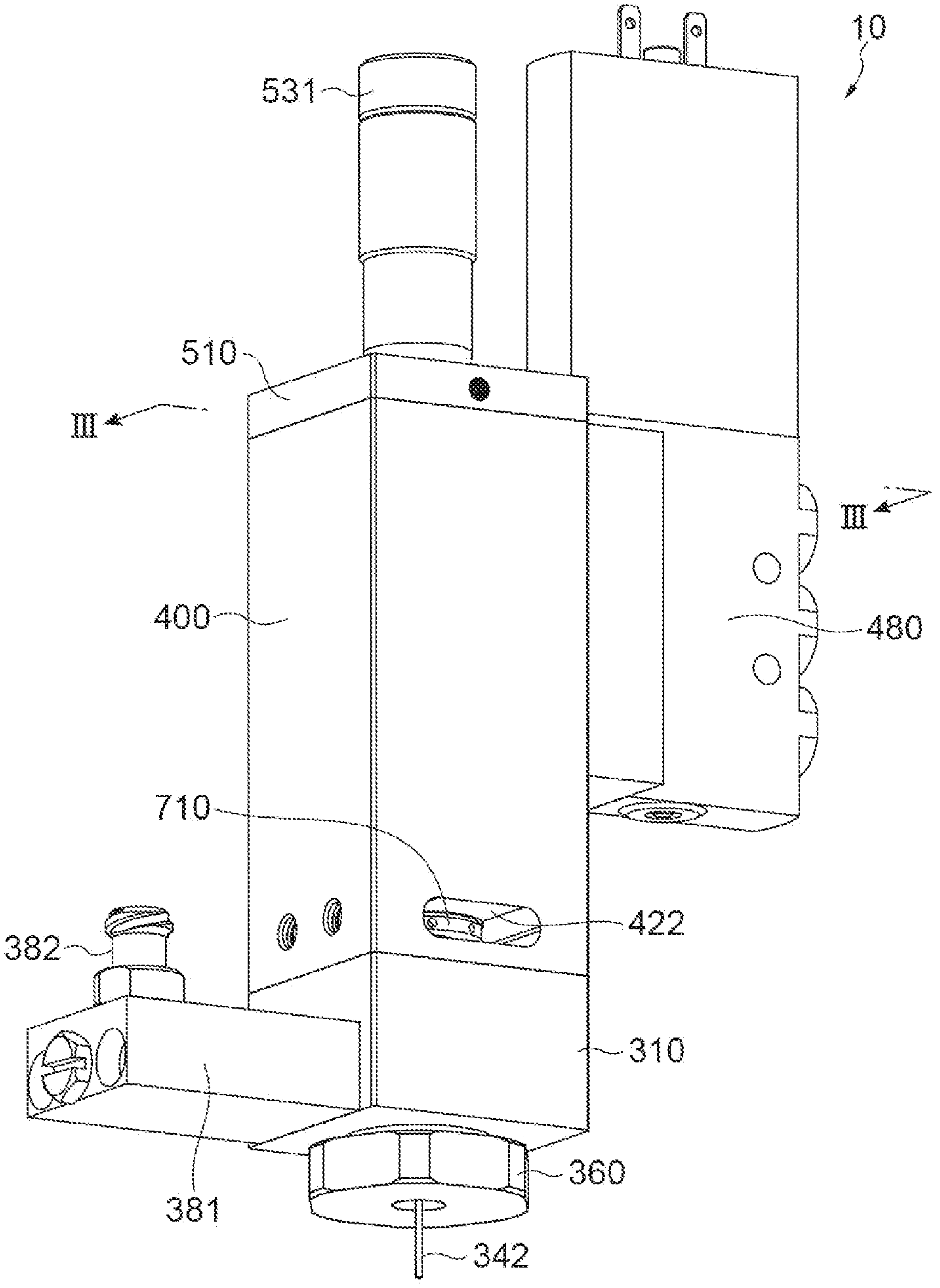
FIG. 2 is a perspective view illustrating an example pump unit.
Figure 3:
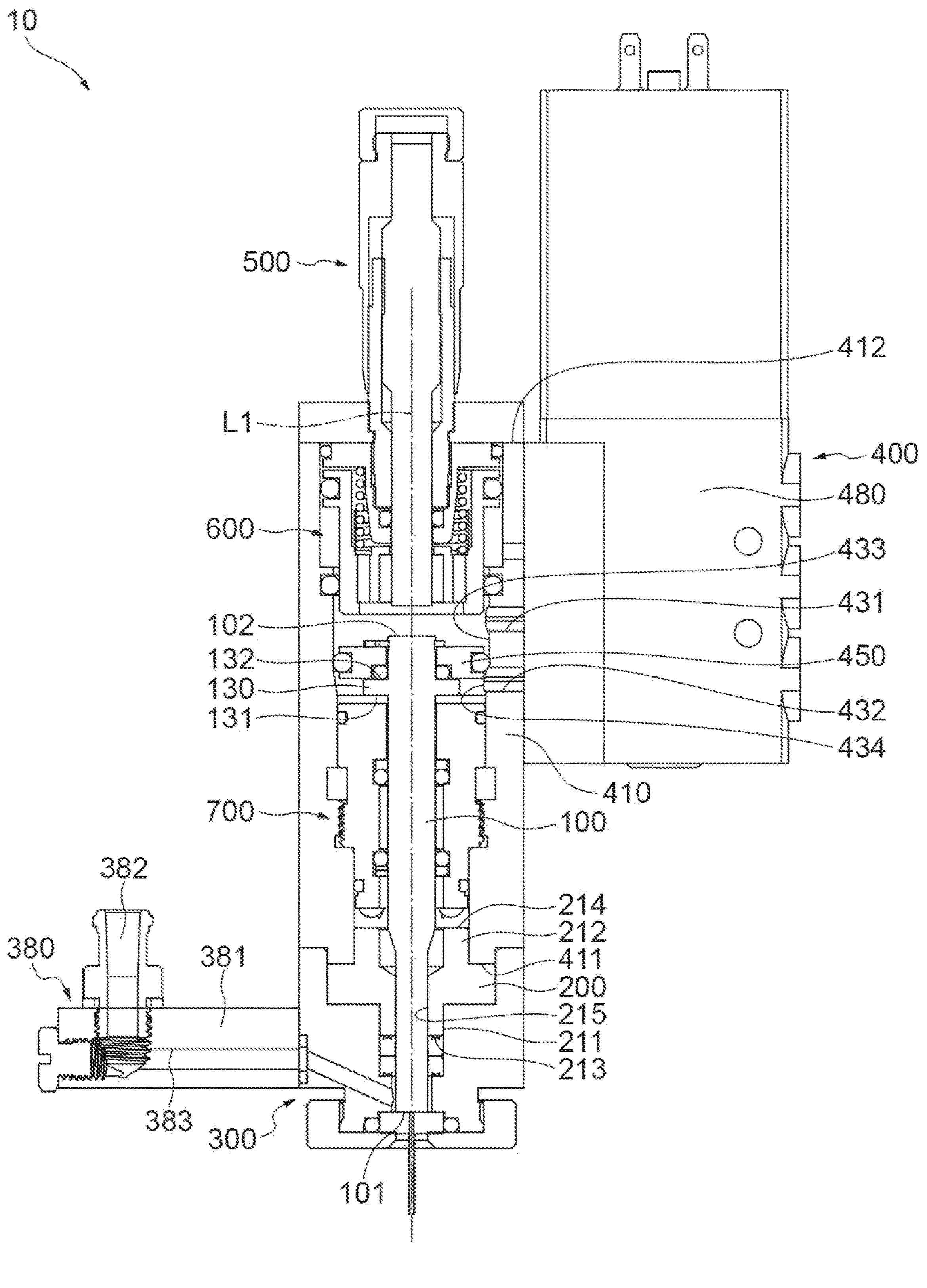
FIG. 3 is a cross-sectional view taken along line III-III.

As shown in FIGS. 2 and 3, the pump unit 10 has a plunger 100, a guide block 200, a dispensing portion 300, a driver 400, an advance restricting unit 700, a retraction restricting unit 500, and a blocking assistance unit 600.

The plunger 100 is a rod-shaped member formed of a metallic material such as stainless steel, titanium alloy, or cemented carbide, and includes a distal end surface 101 and a proximal end surface 102. Hereinafter, a direction in which the distal end surface 101 of the plunger 100 faces is referred to as a "advance direction", and movement in the direction is referred to as "advance". In addition, a direction in which the proximal end surface 102 of the plunger 100 faces is referred to as a "retraction direction", and movement in the direction is referred to as a "retraction".

The plunger 100 has a flange 130 on its outer periphery. The flange 130 has a front surface 131 and a rear surface 132. The front surface 131 faces the advance direction and the rear surface 132 faces the retraction direction. The flange 130 is positioned closer to the proximal end surface 102 between the distal end surface 101 and the proximal end surface 102. For example, the distance from the distal end surface 101 to the front surface 131 is longer than the distance from the proximal end surface 102 to the rear surface 132.

The guide block 200 (guide portion) guides the plunger 100 to advance and retract along an axial line L1 (for example, a center axial line of the plunger 100) that intersects (for example, is orthogonal to) the distal end surface 101 and the proximal end surface 102. The guide block 200 is a cylindrical block member formed of, for example, a fluororesin or an engineering plastic material, and includes a distal end surface 213 and a proximal end surface 214. The distal end surface 213 faces the advance direction and the proximal end surface 214 faces the retraction direction.

The guide block 200 has a guide hole 215 that penetrates between the distal end surface 213 and the proximal end surface 214 along the axial line L1. In the guide hole 215, the plunger 100 is inserted from the proximal end surface 214 toward the distal end surface 213, a distal end portion (the distal end surface 101 and its vicinity) of the plunger 100 is located anterior to the distal end surface 213, and the flange 130 of the plunger 100 is located behind the proximal end surface 214 along the axial line L1. By engagement with the guide hole 215, the plunger 100 is guided to advance and retract along the axial line L1.

A distal end fitting portion 211 is formed on an outer peripheral surface of a distal end portion (the distal end surface 213 and its vicinity) of the guide block 200. A proximal end fitting portion 212 is formed on the outer peripheral surface of a proximal end portion (the proximal end surface 214 and its vicinity) of the guide block 200.

Figure 4:
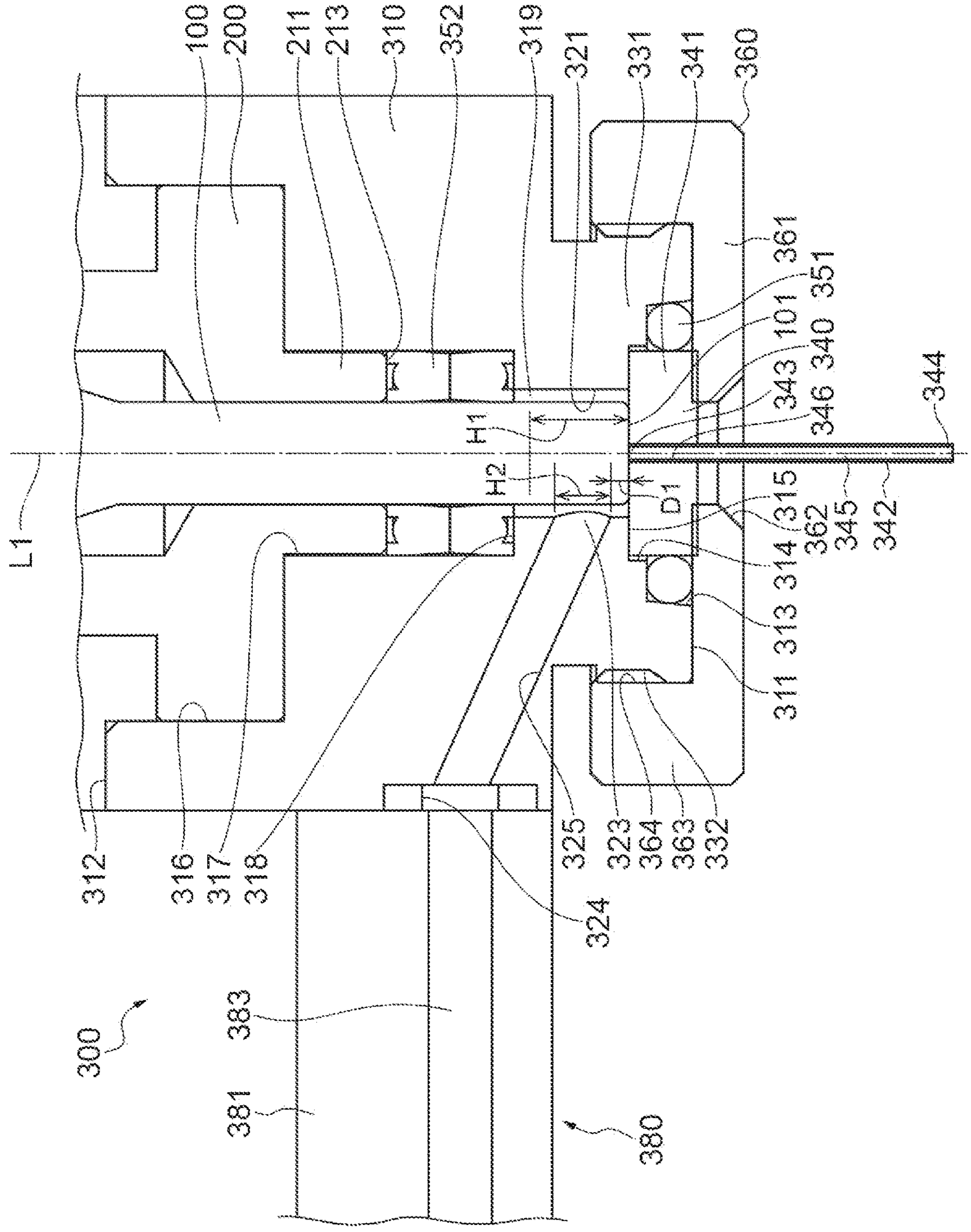
FIG. 4 is an enlarged view of the vicinity of an example dispensing portion in FIG. 3.

The dispensing portion 300 accommodates the distal end portion (the distal end surface 101 and its vicinity) of the plunger 100 and dispenses and suctions liquid in response to advance and retraction of the distal end surface 101. As shown enlarged in FIG. 4, for example, the dispensing portion 300 has a surrounding portion 310, a nozzle unit 340, a nozzle seal 351, a nozzle holder 360, a plunger seal 352, and a barrel attachment portion 380.

The surrounding portion 310 surrounds the distal end surface 101 around the axial line L1 to define an accommodation chamber 319. The surrounding portion 310 is a block material formed of a metallic material such as stainless steel or an aluminum alloy, and contains a distal end surface 311 and a proximal end surface 312. The distal end surface 311 faces the advance direction and the proximal end surface 312 faces the retraction direction.

A circular recess 313 centered on the axial line L1 is formed on the distal end surface 311, and a circular recess 314 centered on the axial line L1 is further formed on the bottom surface of the recess 313. A circular recess 316 centered on the axial line L1 is formed on the proximal end surface 312, and a circular recess 317 centered on the axial line L1 is further formed on the bottom surface of the recess 316. The surrounding portion 310 further includes a circular through-hole 321 extending along the axial line L1 between a bottom surface 315 of the recess 314 and a bottom surface 318 of the recess 317. The through-hole 321 forms the accommodation chamber 319 and accommodates the distal end portion of the plunger 100.

The surrounding portion 310 further includes an inlet 323, a suction port 324, and an inlet flow channel 325. The inlet 323 opens into the accommodation chamber 319 and receives the liquid into the accommodation chamber 319. For example, the inlet 323 opens onto the inner peripheral surface of the through-hole 321. The suction port 324 opens onto the outer peripheral surface of the surrounding portion 310.

The inlet flow channel 325 is formed within the surrounding portion 310 to provide communication between the suction port 324 and the inlet 323. For example, the inlet flow channel 325 is formed by a circular through-hole penetrating between an outer peripheral surface of the surrounding portion 310 and an inner peripheral surface of the through-hole 321, wherein the opening of the inlet flow channel 325 in the inner peripheral surface of the through-hole 321 forms the inlet 323 and the opening of the inlet flow channel 325 in the outer peripheral surface of the surrounding portion 310 forms the suction port 324. The inlet flow channel 325 is inclined with respect to a plane vertical to the axial line L1 so that a portion of the inlet flow channel 325 moves away from the distal end surface 311 as the portion moves away from the axial line L1. Therefore, the inlet 323 and the suction port 324 have an elliptical shape extending along the axial line L1.

A holder attachment portion 331 is formed on the outer peripheral surface of a distal end portion of the surrounding portion 310 (the distal end surface 311 and its vicinity). The outer periphery of the holder attachment portion 331 is positioned inward from the outer peripheral surface of the surrounding portion 310 on which the suction port 324 is formed. As described above, the inlet flow channel 325 is inclined so that a portion of the inlet flow channel 325 moves away from the distal end surface 311 as the portion moves away from the axial line L1, thereby avoiding interference between the outer peripheral surface of the holder attachment portion 331 and the inlet flow channel 325.

The nozzle unit 340 faces the distal end surface 101 of the plunger 100 along the axial line L1. The nozzle unit 340 includes an outlet 343, a dispense port 344, and a dispense flow channel 345. The outlet 343 opens into the accommodation chamber 319 and leads the liquid out of the accommodation chamber 319. The dispense port 344 opens to an outside of the accommodation chamber 319. The dispense flow channel 345 connects the outlet 343 and the dispense port 344 without passing through the check valve.

For example, the nozzle unit 340 has a nozzle base 341 and a nozzle 342. The nozzle base 341 is a disk-shaped portion formed of, for example, a fluororesin or an engineering plastic material, and is fitted into the recess 314. The nozzle base 341 includes a through-hole 346 along the axial line L1. The nozzle 342 is a narrow tube formed of, for example, stainless steel or an aluminum alloy, and is fixed to the nozzle base 341 in a state of being passed through the through-hole 346. The lumen of the nozzle 342 forms the dispense flow channel 345, the opening of the nozzle 342 to the retraction direction forms the outlet 343, and the opening of the nozzle 342 to the advance direction forms the dispense port 344.

The nozzle seal 351 provides a seal between the nozzle unit 340 and the surrounding portion 310. For example, the nozzle seal 351 is an annular seal member (e.g., an O-ring) formed of a rubber material or the like, and is accommodated in the recess 313 in a state of surrounding the nozzle base 341.

The nozzle holder 360 holds the nozzle unit 340 and is attached to the surrounding portion 310. For example, the nozzle holder 360 is a member formed of a metallic material such as stainless steel or an aluminum alloy, and includes a cover plate 361 and a peripheral wall 363. The cover plate 361 covers the distal end surface 311 of the surrounding portion 310. An opening 362 is formed in the central part of the cover plate 361. The cover plate 361 holds the nozzle base 341 and the nozzle seal 351 from the advance direction with the nozzle 342 passed through the opening 362. The peripheral wall 363 rises toward the retraction direction from the periphery of the cover plate 361 and surrounds the holder attachment portion 331.

The peripheral wall 363 is attached to the holder attachment portion 331. For example, a male screw 332 is formed on an outer periphery of the holder attachment portion 331, a female screw 364 corresponding to the male screw 332 is formed on an inner periphery of the peripheral wall 363, and the peripheral wall 363 is attached to the holder attachment portion 331 by screwing the male screw 332 into the female screw 364. By screwing the male screw 332 into the female screw 364, the cover plate 361 approaches the distal end surface 311 and presses the nozzle base 341 and the nozzle seal 351 toward the retraction direction. As the cover plate 361 approaches the distal end surface 311, the nozzle seal 351 is pressed, thereby strengthening the seal between the nozzle unit 340 and the surrounding portion 310. Further, the nozzle seal 351 suppresses the deviation between the center of the surrounding portion 310 and the center of the nozzle unit 340.

The plunger seal 352 faces the nozzle unit 340 across the accommodation chamber 319 and provides a seal between the surrounding portion 310 and the plunger 100. For example, the plunger seal 352 is an annular seal member formed of a plastic material or the like, and is accommodated in the recess 317 in a state of surrounding the distal end portion of the plunger 100.

The guide block 200 is accommodated in the recess 316 of the surrounding portion 310. The distal end fitting portion 211 of the guide block 200 is inserted into the recess 317 and sandwiches the plunger seal 352 with the bottom surface 318 of the recess 317. This keeps the plunger seal 352 in the recess 317.

The barrel attachment portion 380 connects the suction port 324 of the surrounding portion 310 and the barrel 20. For example, the barrel attachment portion 380 has a support arm 381 and an attachment mouthpiece 382 (see FIG. 3). The support arm 381 protrudes outward (toward a direction away from the axial line L1) from a portion of the outer periphery of the surrounding portion 310 where the suction port 324 is formed. The attachment mouthpiece 382 protrudes from the end portion of the suction port 324 toward the retraction direction and receives the liquid delivered from the barrel 20. A relay flow channel 383 is formed in the support arm 381 to communicate the attachment mouthpiece 382 with the suction port 324.

In the dispensing portion 300 constructed in this manner, the plunger seal 352 provides a seal between the surrounding portion 310 and the plunger 100 to substantially seal the accommodation chamber 319 except for the inlet 323 and the outlet 343. Therefore, a volume of the accommodation chamber 319 is changed by the advance and retraction of the distal end surface 101 of the plunger 100.

In response to the advance of the distal end surface 101, the volume of the accommodation chamber 319 decreases, and the internal pressure of the accommodation chamber 319 increases accordingly. This pressurizes liquid toward both the inlet 323 and the outlet 343, but since the inlet 323 is pressurized by the barrel 20, the liquid flows out of the outlet 343 and is dispensed from the dispense port 344. In response to the retraction of the distal end surface 101, the volume of the accommodation chamber 319 increases, and the internal pressure of the accommodation chamber 319 decreases accordingly. As a result, liquid flows in from the inlet 323.

The behavior of the liquid in the dispense flow channel 345 is based on a relationship between the decompression caused by the retraction of the distal end surface 101 and the pressurization caused by the barrel 20 (hereinafter referred to as "pressurization relationship"). For example, if the pressurization relationship is adjusted such that a pressure inside the accommodation chamber 319 is less than or equal to a pressure outside the accommodation chamber 319 (for example, atmospheric pressure) during at least a part of a period during the retraction of the plunger 100 (hereinafter referred to as a "retraction period"), the dispense of liquid from the dispense port 344 ceases during at least a part of the retraction period.

Here, the inlet 323 may be positioned closer to the nozzle unit 340 between the plunger seal 352 and the nozzle unit 340. The distance from the inlet 323 to the nozzle unit 340 (a distance D1 in FIG. 4) may be less than or equal to half of a maximum stroke H1 of the distal end surface 101 of the plunger 100. The maximum stroke H1 is a distance from the most retracted position of the end surface 101 to the most advanced position of the distal end surface 101. More than half of the maximum stroke H1 may overlap the inlet 323. For example, an opening height H2 of the inlet 323 in the direction along the axial line L1 may be half or more of the maximum stroke H1, and the most retracted position of the distal end surface 101 may be located behind the inlet 323, and the most advanced position of the distal end surface 101 may be located anterior to the inlet 323 along the axial line L1. The inlet 323 can be opened at the beginning of the retraction period, so that liquid is suctioned quickly into the accommodation chamber 319. Also, in most of the retraction period, the opening of the inlet 323 becomes larger as the distal end surface 101 retracts, so that the liquid is suctioned more quickly. Further, since the opening of the inlet 323 becomes smaller as the distal end surface 101 advances in most of a period of the advance of the distal end surface 101, a pressure into the inlet 323 can be suppressed and the liquid can be rapidly dispensed from the outlet 343.

Figure 5:
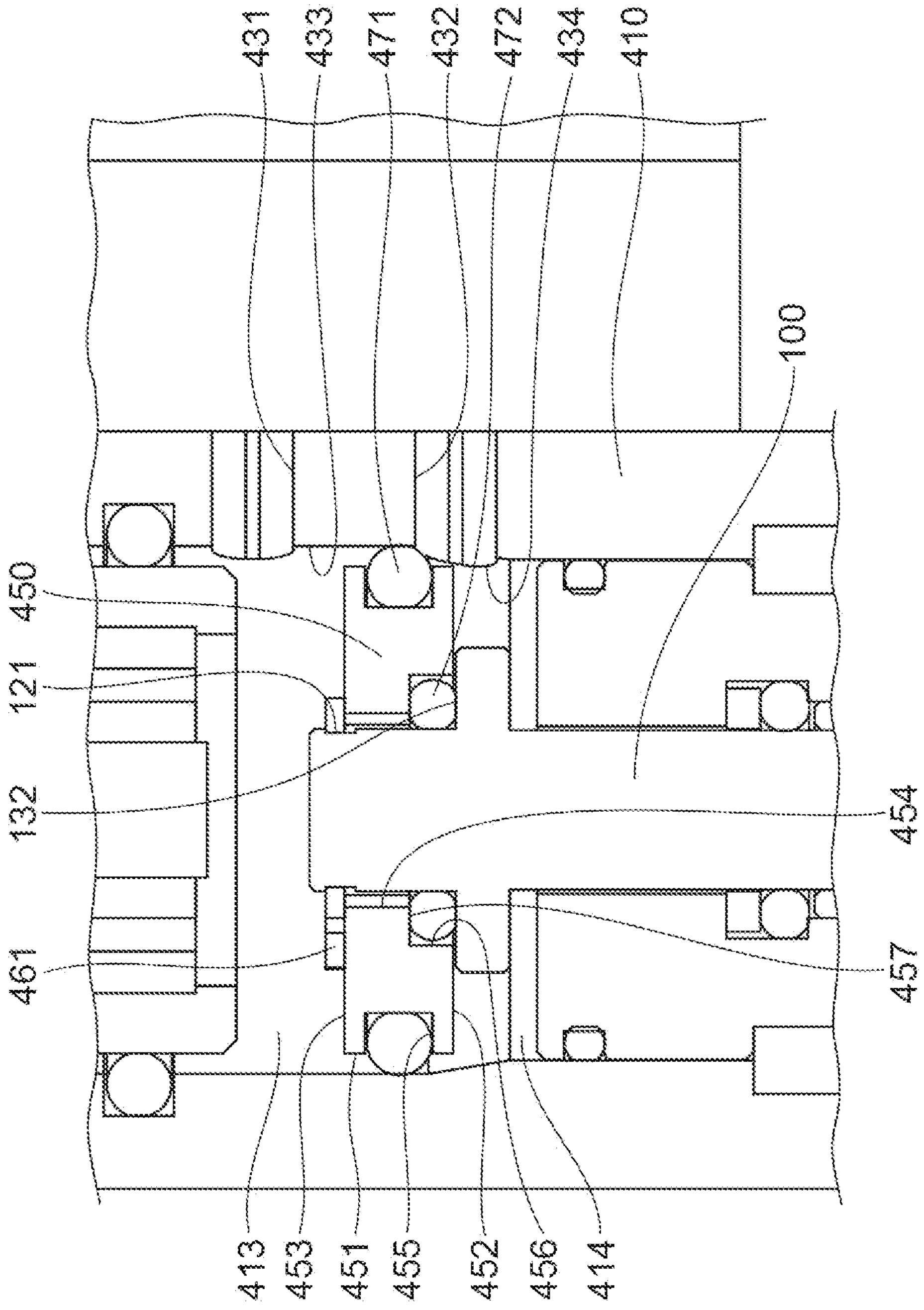
FIG. 5 is an enlarged view of the vicinity of an example piston in FIG. 3.

The driver 400 causes the driving gas to advance and retract the proximal end portion of the plunger 100. As shown enlarged in FIG. 5, for example, the driver 400 has a cylinder 410, a piston 450, an outer seal 471, an inner seal 472, and a piston driver 480.

The cylinder 410 accommodates the proximal end portion of the plunger 100. The cylinder 410 is a cylindrical member formed of a metallic material such as stainless steel or an aluminum alloy, and includes a distal end surface 411 and a proximal end surface 412 (see FIG. 3). The distal end surface 411 faces the advance direction and the proximal end surface 412 faces the retraction direction. The cylinder 410 has a second pressurizing hole 432 and a first pressurizing hole 431 arranged in order from the advance direction to the retraction direction. Each of the second pressurizing hole 432 and the first pressurizing hole 431 penetrates between an inner peripheral surface and an outer peripheral surface of the cylinder 410.

With the cylinder 410 accommodating the proximal end portion of the plunger 100, the distal end portion (the distal end surface 411 and its vicinity) of the cylinder 410 is connected to the dispensing portion 300. For example, the distal end portion of the cylinder 410 fits to the proximal end fitting portion 212 of the guide block 200 and is connected to the surrounding portion 310 around the recess 316.

The piston 450 is provided to the cylinder 410 to partition the cylinder 410 along the axial line L1 into a first space 413 and a second space 414. The first space 413 is a space located behind the piston 450 along the axial line L1, and the second space 414 is a space located anterior to the piston 450 along the axial line L1. The piston 450 causes the plunger 100 to advance in response to the first space 413 pressurized and the plunger 100 to retract in response to the second space 414 pressurized.

The piston 450 is annular and may partition the cylinder 410 into the first space 413 and the second space 414 between the outer peripheral surface of the plunger 100 and the inner peripheral surface of the cylinder 410. For example, the piston 450 is an annular plate member formed of a metallic material such as stainless steel or an aluminum alloy, and includes a distal end surface 452, a proximal end surface 453, and a through-hole 454. The distal end surface 452 faces the advance direction and the proximal end surface 453 faces the retraction direction. The through-hole 454 penetrates along the axial line L1 between the distal end surface 452 and the proximal end surface 453. An inner radius of the through-hole 454 is greater than an outer radius of the proximal end portion of the plunger 100. On an outer peripheral surface 451 of the piston 450, a groove 455 is formed over the entire circumference around the axial line L1. A recess 456 centered on the axial line L1 is formed in the distal end surface 452.

The piston 450 is attached to the proximal end portion of the plunger 100 so that the piston 450 can float (move) in a direction vertical to the axial line L1. For example, the driver 400 further comprises a holder 461. The holder 461 holds the piston 450 around the proximal end portion of the plunger 100 while allowing the piston 450 to float in the direction vertical to the axial line L1. For example, the holder 461 sandwiches the piston 450 with the flange 130 with the proximal end portion of the plunger 100 passed through the through-hole 454.

For example, a holding groove 121 is formed on the outer peripheral surface of the proximal end portion of the plunger 100 over an entire circumference around the axial line L1. With the piston 450 in contact with the rear surface 132 of the flange 130, the holding groove 121 is located behind the piston 450 along the axial line L1. The holder 461 is, for example, a C-shaped snap ring, which is fitted into the holding groove 121 that is located behind the piston 450 along the axial line L1. Thus, the piston 450 is sandwiched between the flange 130 and the holder 461. As described above, the inner radius of the through-hole 454 is greater than the outer radius of the proximal end portion of the plunger 100. The piston 450 is allowed to float in the direction vertical to the axial line L1 by the difference between the inner radius of the through-hole 454 and the outer radius of the proximal end portion of the plunger 100.

The outer seal 471 seals between the piston 450 and the cylinder 410. For example, the outer seal 471 is an annular seal member (e.g., an O-ring) formed of a rubber material or the like, and is accommodated in the groove 455. The outer seal 471 seals between the piston 450 and the cylinder 410 by contacting the bottom surface of the groove 455 and the inner peripheral surface of the cylinder 410.

The inner seal 472 (seal portion) seals between the piston 450 and the plunger 100 while allowing the piston 450 to float in the direction vertical to the axial line L1. For example, the inner seal 472 is an annular seal member (for example, an O-ring) formed of a rubber material or the like, and is accommodated in the recess 456 in a state of surrounding the plunger 100. The inner seal 472 seals between the piston 450 and the plunger 100 by contacting a bottom surface 457 (annular first seal surface) of the recess and the rear surface 132 (annular second seal surface facing the first seal surface) of the flange 130.

Since the bottom surface 457 and the rear surface 132 intersect (for example, are orthogonal to) the axial line L1, even if the piston 450 floats in a vertical direction in the axial line L1, the inner seal 472 is kept in contact with the bottom surface 457 and the rear surface 132. Therefore, both the float property of the piston 450 and the seal property between the piston 450 and the plunger 100 can be achieved.

The piston driver 480 switches between a first state in which a pressure from a pressurizing source (a pressure of the above mentioned driving gas) is applied to the first space 413 and a second state in which the pressure from the pressurizing source is applied to the second space 414 in accordance with the supply of the driving power. For example, the piston driver 480 may pressurize the first space 413 when there is no supply of the driving power and pressurize the second space 414 when there is the supply of the driving power. An example structure of the piston driver 480 will be described later.

Figure 6:
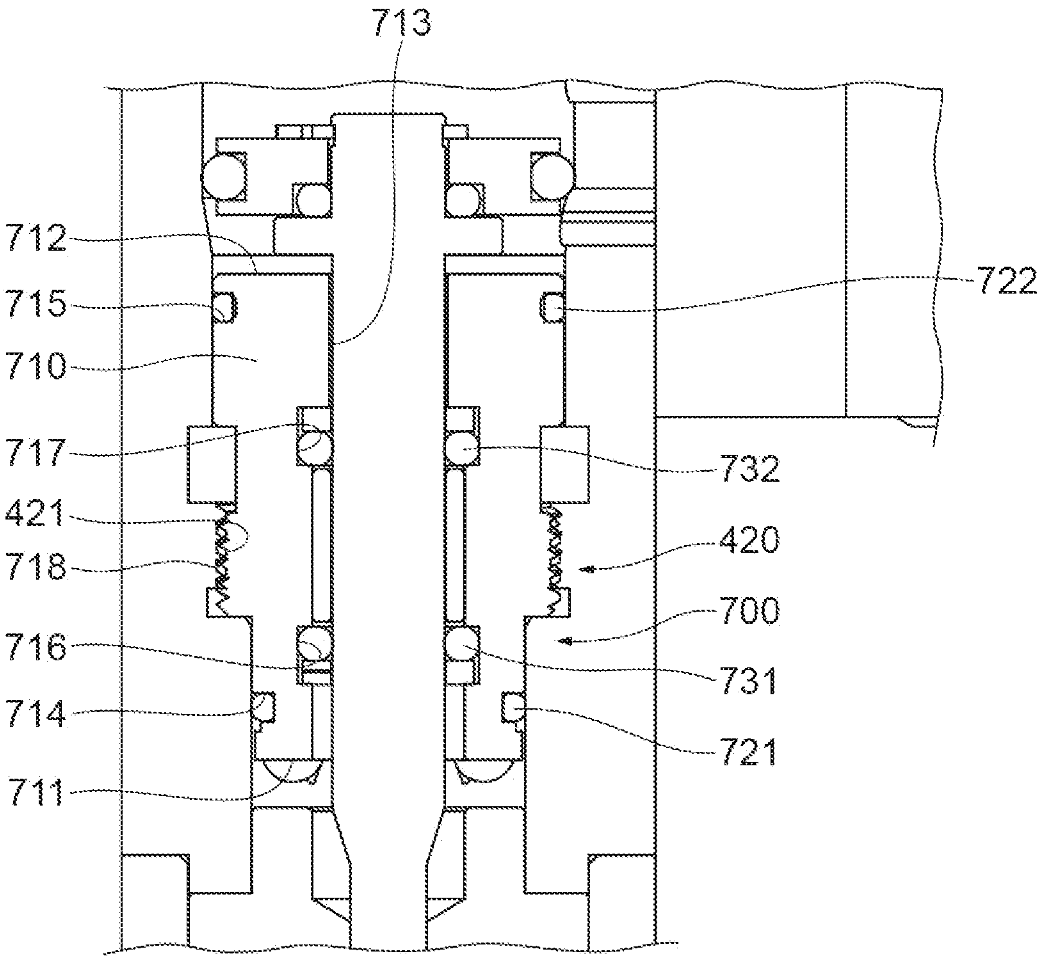
FIG. 6 is an enlarged view of the vicinity of an example advance regulation unit in FIG. 3.

The advance restricting unit 700 regulates an advance of the plunger 100. For example, the advance restricting unit 700 is provided between the guide block 200 and the flange 130, and regulates an advance of the flange 130. For example, the advance restricting unit 700 may be placed in the second space 414 to provide a seal between the inner peripheral surface of the cylinder 410 and the outer peripheral surface of the plunger 100 while restricting the advance of the flange 130. As shown enlarged in FIG. 6, by way of example, the advance restricting unit 700 has an advance restricting block 710, outer seals 721, 722, and inner seals 731, 732. The advance restricting block 710 (advance regulating portion) is a cylindrical block member formed of a metallic material such as stainless steel or an aluminum alloy, and includes a distal end surface 711 and a proximal end surface 712. The distal end surface 711 faces the advance direction and the proximal end surface 712 faces the retraction direction. The advance restricting block 710 has a guide hole 713 that penetrates between the distal end surface 711 and the proximal end surface 712 along the axial line L1. The plunger 100 is inserted into the guide hole 713 from the proximal end surface 712 toward the distal end surface 711. The proximal end surface 712 of the advance restricting block 710 faces the front surface 131 of the flange 130 to regulate the advance of the flange 130.

A groove 714 is formed on an outer peripheral surface of a distal end portion (the distal end surface 711 and its vicinity) of the advance restricting block 710 over an entire circumference around the axial line L1. A groove 715 is formed on an outer peripheral surface of a proximal end portion (the proximal end surface 712 and its vicinity) of the advance restricting block 710 over an entire circumference around the axial line L1. Grooves 716,717 arranged along the axial line L1 are formed on an inner peripheral surface of the guide hole 713. Each of the grooves 716 717 extends around an entire circumference of the axial line L1.

Each of the outer seals 721,722 is an annular seal member (for example, an O-ring) formed of a rubber material or the like and seals between the advance restricting block 710 and the cylinder 410. For example, an outer seal 721 may be accommodated in the groove 714 in a state of surrounding the advance restricting block 710, and may be in contact with a bottom surface of the groove 714 and the inner peripheral surface of the cylinder 410 to seal between the advance restricting block 710 and the cylinder 410. An outer seal 722 may be accommodated in the groove 715 in a state of surrounding the advance restricting block 710, and may be in contact with the bottom surface of the groove 715 and the inner peripheral surface of the cylinder 410 to seal between the advance restricting block 710 and the cylinder 410.

Each of the inner seals 731 732 is an annular seal member (for example, an O-ring) formed of a rubber material or the like, and seals between the advance restricting block 710 and the plunger 100. For example, an inner seal 731 may be accommodated in the groove 716 in a state of surrounding the plunger 100, and may be in contact with the bottom surface of the groove 716 and the outer peripheral surface of the plunger 100 to seal between the advance restricting block 710 and the plunger 100. An inner seal 732 may be accommodated in the groove 717 in a state of surrounding the plunger 100, and may be in contact with the bottom surface of the groove 717 and the outer peripheral surface of the plunger 100 to seal between the advance restricting block 710 and the plunger 100.

The pump unit 10 further comprises an advance limit adjuster 420. The advance limit adjuster 420 adjusts the position of the advance restricting unit 700 relative to the cylinder 410 in a direction along the axial line L1. For example, the advance limit adjuster 420 has a male screw 718, a female screw 421, and an adjustment window 422. The male screw 718 is formed around the outer peripheral surface of the advance restricting block 710 between the groove 714 and the groove 715. The female screw 421 is formed on a portion of the inner peripheral surface of the cylinder 410 corresponding to the male screw 718. The advance restricting unit 700 is placed in the cylinder 410 with the male screw 718 screwed into the female screw 421.

The adjustment window 422 (see FIG. 2) penetrates between the inner peripheral surface and the outer peripheral surface of the cylinder 410 at a position located anterior to the groove 714 along the axial line L1. The adjustment window 422 exposes a portion of the outer peripheral surface of the advance restricting block 710 to the exterior of the cylinder 410. Thus, an operation force around the axial line L1 can be applied to the outer peripheral surface of the advance restricting block 710 from the outside of the cylinder 410, and the advance restricting block 710 can be rotated around the axial line L1.

Rotating the advance restricting block 710 rotates the male screw 718 relative to the female screw 421 and displaces the advance restricting block 710 along the axial line L1. This adjusts the position of the advance restricting unit 700 relative to the cylinder 410. The above-described maximum stroke H1 is a stroke in a state in which the advance restricting unit 700 is located at the most advanced position along the axial line L1.

Figure 7:
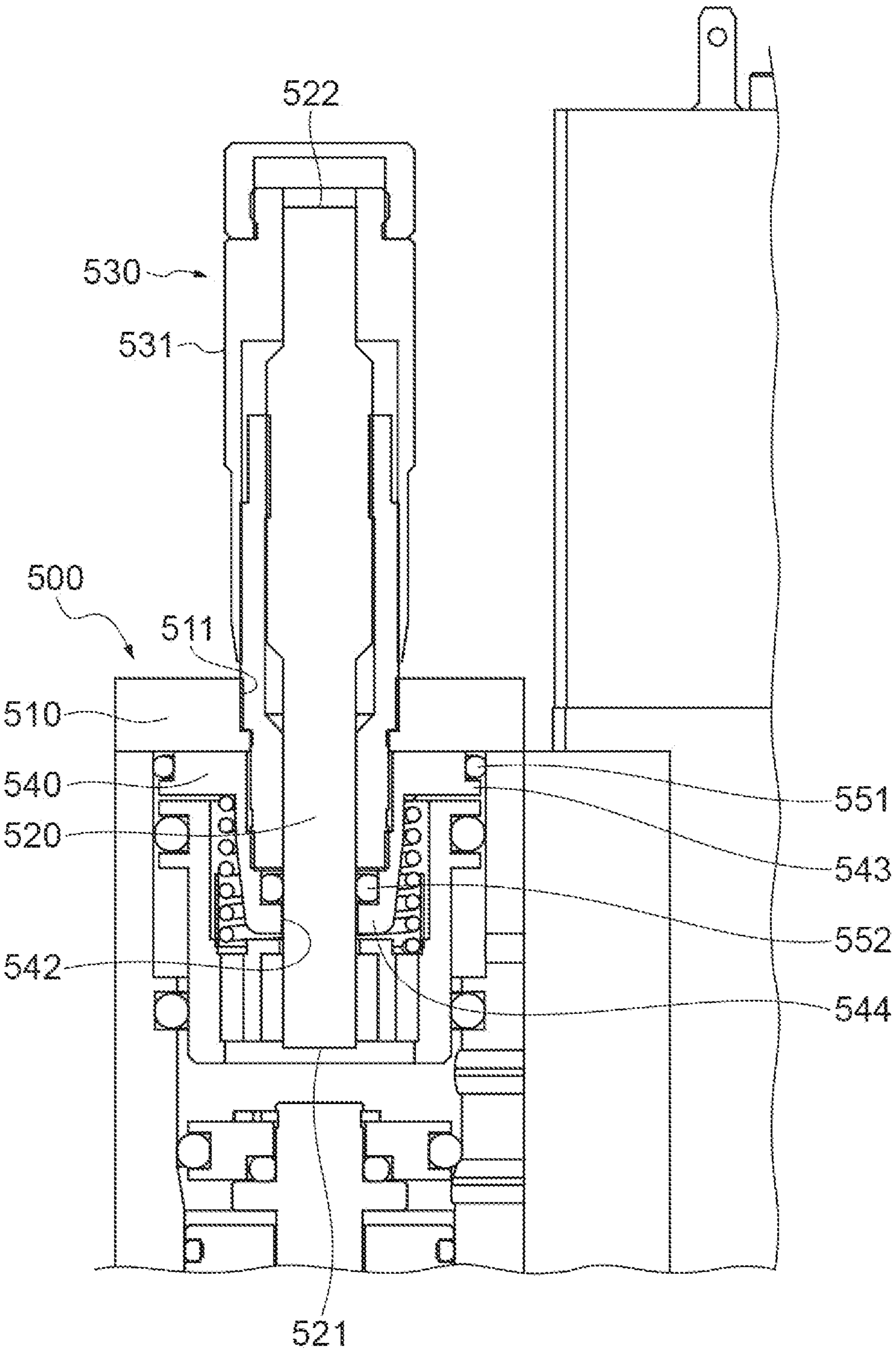
FIG. 7 is an enlarged view of the vicinity of an example retract regulating unit in FIG. 3.

The retraction restricting unit 500 regulates the retraction of the plunger 100. For example, the retraction restricting unit 500 is connected to the proximal end portion of the cylinder 410 and regulates the retraction of the proximal end surface 102 of the plunger 100. As shown enlarged in FIG. 7, for example, the retraction restricting unit 500 has an outer cap 510, a regulating rod 520, a retraction limit adjustment portion 530, an inner cap 540, an outer seal 551, and an inner seal 552.

The outer cap 510 is a plate-shaped member formed of a metallic material such as stainless steel or an aluminum alloy, and closes the proximal end portion of the cylinder 410. The outer cap 510 has an opening 511 in its center.

The regulating rod 520 is a rod-shaped member formed of a metallic material such as stainless steel or an aluminum alloy, and is inserted into the opening 511 along the axial line L1. The regulating rod 520 has a distal end surface 521 and a proximal end surface 522. The distal end surface 521 faces the advance direction and the proximal end surface 522 faces the retraction direction. The distal end surface 521 (retraction restricting portion) faces the proximal end surface 102 of the plunger 100 in the cylinder 410 and restricts the retraction of the plunger 100. The proximal end surface 522 is positioned outside the cylinder 410.

The retraction limit adjustment portion 530 accommodates the regulating rod 520 outside the cylinder 410. The retraction limit adjustment portion 530 has a handle 531 and causes the regulating rod 520 to advance and retract in response to the rotation of the handle 531 about the axial line L1. This adjusts the position of the distal end surface 521 in a direction along the axial line L1. The above-described maximum stroke H1 is a stroke in a state in which the distal end surface 521 is located at the most retracted position along the axial line L1.

The inner cap 540, the outer seal 551 and the inner seal 552 provide a seal between the cylinder 410 and the regulating rod 520 in the cylinder 410. For example, the inner cap 540 has a through-hole 542 in its center. The inner cap 540 is placed in the cylinder 410 and secured to the outer cap 510 with the regulating rod 520 passed through the through-hole 542.

The outer seal 551 seals between the inner cap 540 and the cylinder 410 by contacting the outer peripheral surface of the inner cap 540 and the inner peripheral surface of the cylinder 410. A flange 543 is formed on an outer peripheral surface of the inner cap 540 and the outer seal 551 is held between the flange 543 and the outer cap 510.

The inner seal 552 seals between the inner cap 540 and the regulating rod 520 by contacting an inner peripheral surface of the through-hole 542 and an outer peripheral surface of the regulating rod 520. An inward flange 544 is formed on the inner peripheral surface of the through-hole 542 and the inner seal 552 is held between the inward flange 544 and the outer cap 510.

When the pressurizing source is not supplied to the piston driver 480, the blocking assistance unit 600 applies a repulsive force to the piston 450 toward the advance direction to keep the plunger 100 at the most advanced position (the position in which the front surface 131 is in contact with the advance restricting block 710). This keeps the distal end surface 101 of the plunger 100 in close proximity to the nozzle unit 340, thereby keeping the outlet 343 substantially blocked and preventing leakage of liquid from the outlet 343.

For example, the blocking assistance unit 600 has a spring 620 and a pusher 630. For example, the spring 620 applies a repulsive force to the plunger 100 toward the advance direction. For example, the spring 620 is a coil spring that surrounds the regulating rod 520 and generates a repulsive force against compression along the axial line L1 direction. The pusher 630 intervenes between the spring 620 and the piston 450 and transmits the repulsive forces generated by the spring 620 to the piston 450. In this configuration, the spring 620 applies the repulsive force to the piston 450 between the outer peripheral surface of the plunger 100 and the inner peripheral surface of the cylinder 410 via the pusher 630.

Figure 8:
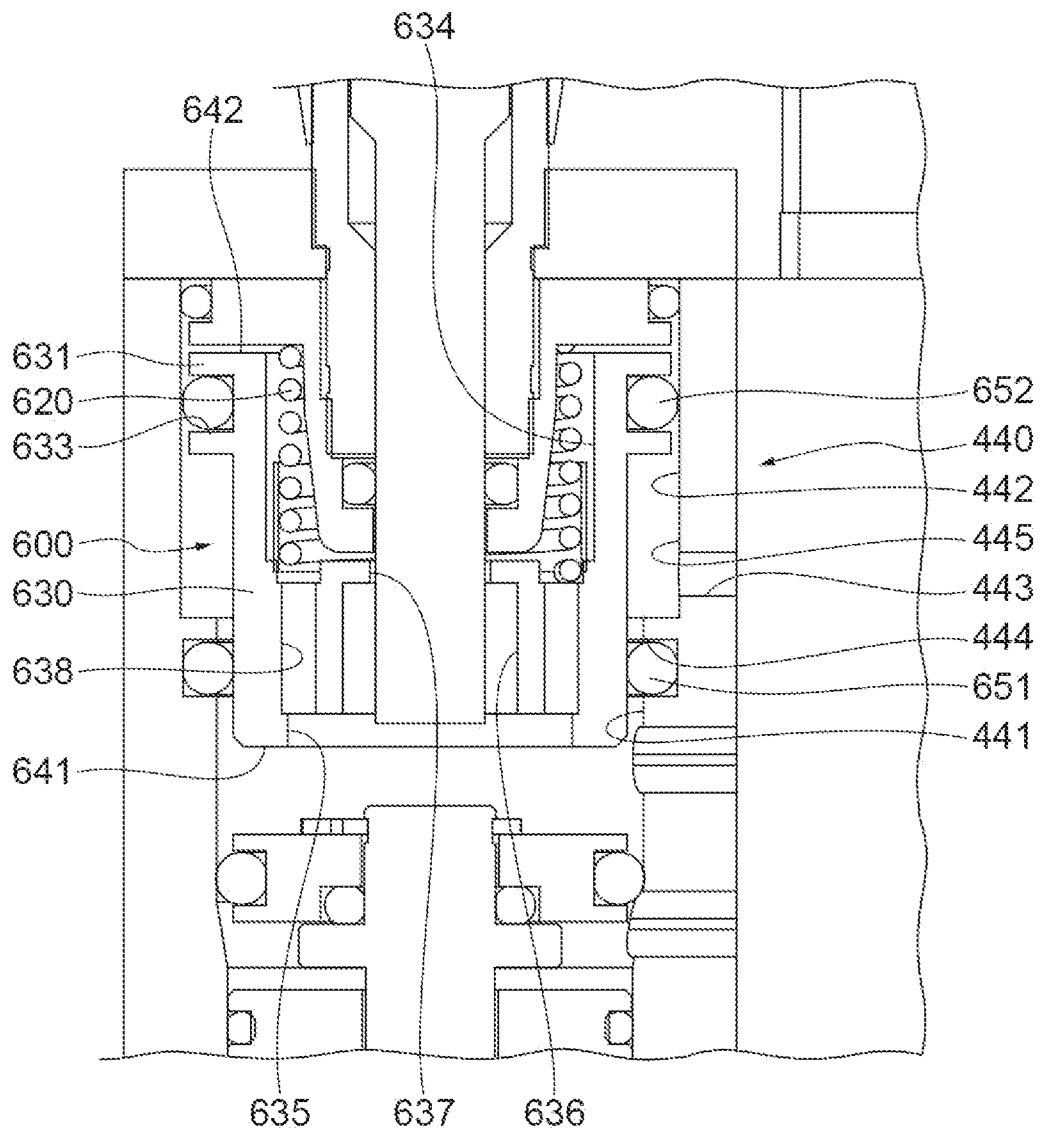
FIG. 8 is an enlarged view around an example block assistance unit in FIG. 3.

As shown enlarged in FIG. 8, the pusher 630 is a cylindrical block member formed of a metallic material such as stainless steel or aluminum alloy, and is disposed in the cylinder 410 along the axial line L1. The pusher 630 has a distal end surface 641 and a proximal end surface 642. The distal end surface 641 faces the advance direction and the proximal end surface 642 faces the retraction direction. A recess 634 centered on the axial line L1 is formed in the proximal end surface 642. The spring 620 is accommodated in the recess 634. The spring 620 exerts a repulsive force on the bottom surface of the recess 634.

A recess 635 centered on the axial line L1 is formed in the distal end surface 641, and a recess 636 centered on the axial line L1 is further formed in the bottom surface of the recess 635. An opening 637 centered on the axial line L1 is formed between the bottom surface of the recess 636 and the bottom surface of the recess 634, and the regulating rod 520 is passed through the opening 637. A plurality of vent holes 638 are formed between the bottom surface of the recess 635 and the bottom surface of the recess 634. Thus, the space in which the piston 450 is disposed and the space in which the spring 620 is disposed communicate with each other. When the pusher 630 contacts the piston 450, the recess 635 receives the holder 461 and the recess 636 receives the proximal end portion of the plunger 100.

The pump unit 10 further comprises a release portion 440. The release portion 440 releases the application of a repulsive force to the piston 450 by the spring 620 by the pressure of the pressurizing source (for example, the pressure of the driving gas). Therefore, when the pressure of the pressurizing source is supplied, the repulsive force of the spring 620 does not act as resistance against the sliding of the piston 450, and the piston 450 can slide at high speed. For example, the release portion 440 forms a third space, between the pusher 630 and the cylinder 410, to which the pressure of the pressurizing source is applied in both the first state and the second state, and releases the application of the repulsive force by the spring 620 by pressurizing of the third space. As an example, the release portion 440 has switching seals 651, 652, and a third pressurizing hole 443.

In the cylinder 410, an inner diameter of a portion that accommodates a distal end portion (the distal end surface 641 and its vicinity) of the pusher 630 (hereinafter referred to as "a first accommodation portion 441"), and an inner diameter of a portion that accommodates a proximal end portion (the proximal end surface 642 and its vicinity) of the pusher 630 (hereinafter referred to as "a second accommodation portion 442") are different with each other. In particular, the inner diameter of the second accommodation portion 442 is greater than the inner diameter of the first accommodation portion 441. On the inner peripheral surface of the first accommodation portion 441, a groove 444 is formed over an entire circumference around an axial line L1. A flange 631 is formed on the outer peripheral surface of the proximal end portion of a pusher 630. On the outer peripheral surface of the flange 631, a groove 633 is formed over an entire circumference around the axial line L1.

A switching seal 651 provides a seal between the pusher 630 and the first accommodation portion 441. For example, the switching seal 651 may be an annular seal member (e.g., an O-ring) formed of a rubber material or the like and accommodated in the groove 444 surrounding the distal end portion of the pusher 630. The switching seal 651 seals between the pusher 630 and the first accommodation portion 441 by contacting the bottom surface of the groove 444 and the outer peripheral surface of the pusher 630.

A switching seal 652 provides a seal between the pusher 630 and the second accommodation portion 442. For example, the switching seal 652 is an annular seal member (for example, an O-ring) formed of a rubber material or the like, and is accommodated in the groove 633 surrounding the flange 631 of the pusher 630. The switching seal 652 seals between the pusher 630 and the second accommodation portion 442 by contacting the bottom surface of the groove 633 and the inner peripheral surface of the second accommodation portion 442. The third pressurizing hole 443 penetrates between the inner peripheral surface and the outer peripheral surface of the cylinder 410 between the switching seal 651 and the switching seal 652. The third pressurizing hole 443 is connected to the pressurizing source in both the first state and the second state.

With the above configuration, the third space 445 is formed between the switching seal 651 and the switching seal 652, which is sealed except for the third pressurizing hole 443 and is connected to the pressurizing source in both of the first state and the second state. As the third pressurizing hole 443 is pressurized by the pressurizing source, the pusher 630 retracts with the switching seal 652 to correspondingly enlarge the third space 445. This moves the pusher 630 away from a piston 450 and releases the application of the repulsive force by the spring 620 to the piston 450. As described above, since the space in which the piston 450 is disposed and the space in which the spring 620 is disposed communicate with each other by the plurality of vent holes 638 formed in the pusher 630, a difference in pressures between these two spaces is less likely to occur. Therefore, the pusher 630 smoothly rebounds in response to the pressurizing of the third space 445.

The above-described plunger 100, guide block 200, dispensing portion 300, driver 400, advance restricting unit 700, retraction restricting unit 500, and blocking assistance unit 600 are integrated by connecting the surrounding portion 310, the cylinder 410, and the outer cap 510.

Figure 9:
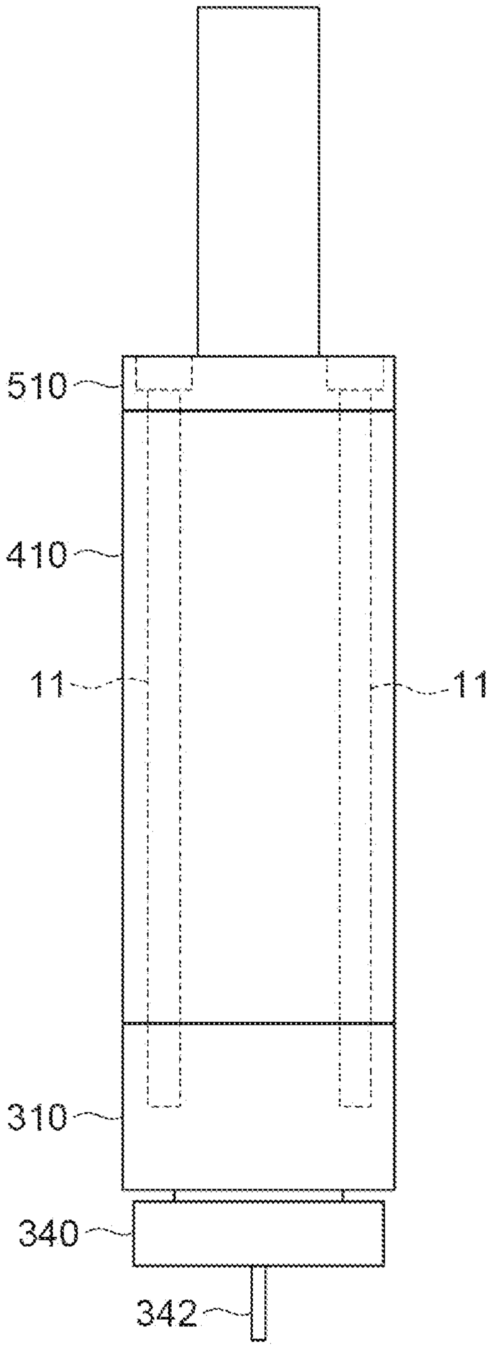
FIG. 9 is a schematic view illustrating an example configuration of a connecting portion of a surrounding portion, a cylinder, and an outer cap.

As shown in FIG. 9, the surrounding portion 310, the cylinder 410, and the outer cap 510 may be connected by a plurality of through bolts 11 (fastening members) that are inserted into the outer cap 510 from the retraction direction toward the advance direction and reach the surrounding portion 310. Since the removal of the through bolts 11 can be performed from the opposite side of the nozzle unit 340 dispensing the liquid, the maintenance workability is improved.

Figure 10:
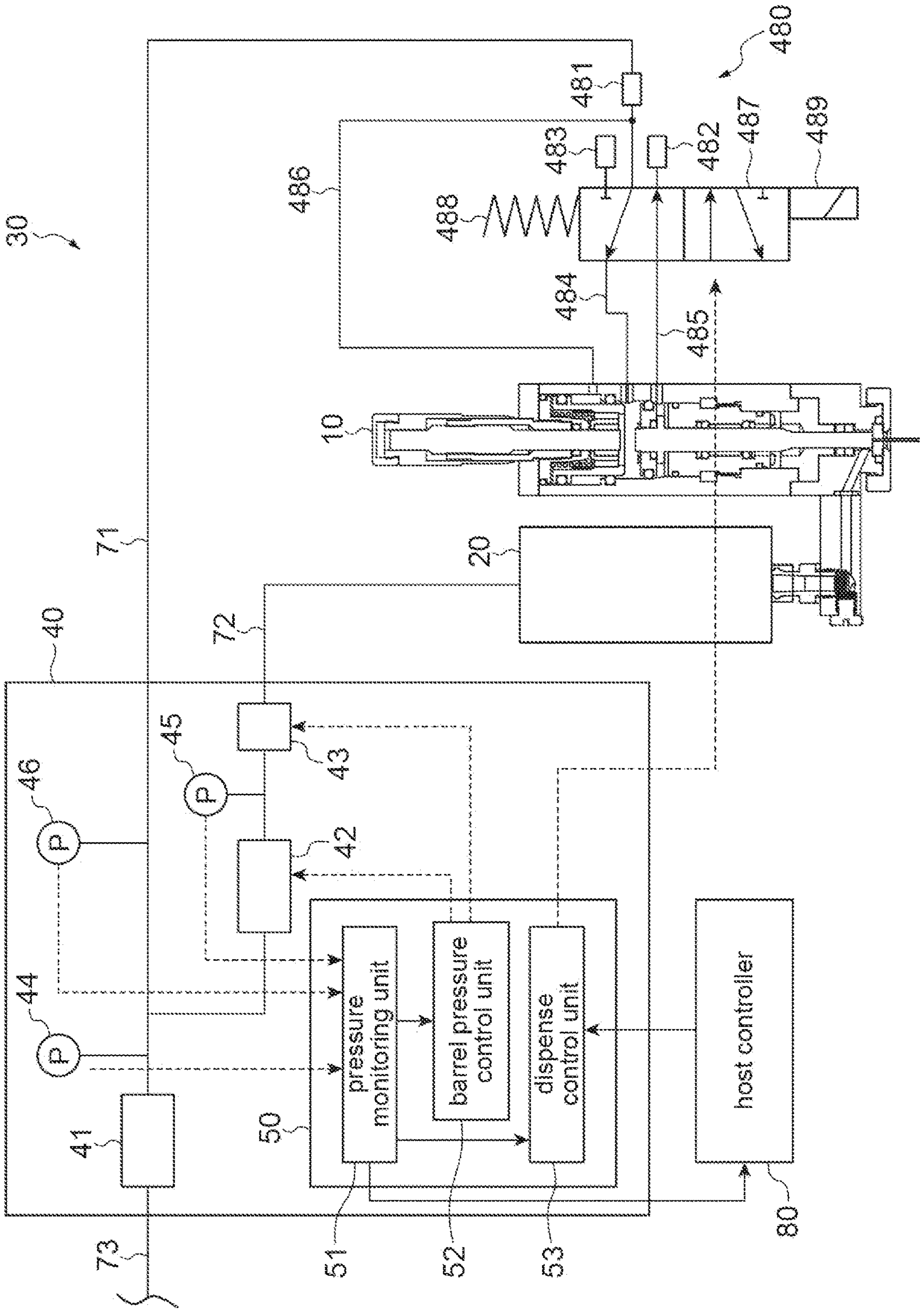
FIG. 10 is a schematic diagram illustrating an example configuration of a piston driver.

Here, the configuration of the above piston driver 480 will be described. As shown in FIG. 10, the piston driver 480 has a pressurizing port 481, exhaust ports 482, 483, a first flow channel 484, a second flow channel 485, a third flow channel 486, a solenoid valve 487, an elastic member 488, and a solenoid 489.

The pressurizing port 481 is a port for supplying the driving gas. Exhaust ports 482,483 are ports for exhausting gas in the cylinder 410. The first flow channel 484 is a flow channel connected to the first pressurizing hole 431, and the second flow channel 485 is a flow channel connected to the second pressurizing hole 432. The third flow channel 486 is a flow channel connecting the pressurizing port 481 and the third pressurizing hole 443.

The solenoid valve 487 moves between a first position and a second position. The solenoid valve 487 connects the first flow channel 484 and the pressurizing port 481, and connects the second flow channel 485 and the exhaust port 482 in the first position. Hereinafter, this state is referred to as a first state. In the first state, the first space 413 is pressurized by the driving gas, gas of the second space 414 is exhausted from the exhaust port 482, and the piston 450 advances.

The solenoid valve 487 connects the second flow channel 485 and the pressurizing port 481, and connects the first flow channel 484 and the exhaust port 483 in the second position. Hereinafter, this state is referred to as a second state. In the second state, the second space 414 is pressurized by the driving gas, gas of the first space 413 is exhausted from the exhaust port 483, and the piston 450 retracts.

The elastic member 488 applies an elastic repulsive force from the second position toward the first position to the solenoid valve 487. The solenoid 489 applies a driving force from the first position toward the second position to the solenoid valve 487 by the supplied driving power. Therefore, in a state in which the driving power is not supplied to the solenoid 489, the solenoid valve 487 is disposed at the first position by the elastic repulsive force of the elastic member 488. In a state where the driving power is supplied to the solenoid 489, the solenoid valve 487 is arranged at the second position by the driving force against the elastic repulsive force.

According to such a configuration, even in a case where the driving power is not supplied due to a failure of a controller 30 described later or the like, the plunger 100 is maintained in the most advanced state as long as the supply of the driving gas is continued. This prevents leakage of liquid since the outlet 343 is substantially blocked.

The third pressurizing hole 443 is directly connected to the pressurizing port 481 by the third flow channel 486. Therefore, in both the first state and the second state, the third space 445 is pressurized by the driving gas. Therefore, as long as the driving gas is supplied to the pressurizing port 481, the application of the repulsive force to the piston 450 by the spring 620 is released, and the piston 450 can readily be operated at high speed.

When the supply of the driving gas to the pressurizing port 481 is stopped due to a failure of the controller 30 or the like, since the driving gas is not supplied to the third space 445, the application of the repulsive force to the piston 450 by the spring 620 is resumed and the plunger 100 is kept in the most advanced state. This prevents leakage of liquid since the outlet 343 is substantially blocked.

(Barrel)

The barrel 20 pumps liquid from outside the accommodation chamber 319 to the inlet 323. As shown in FIG. 1, for example, the barrel 20 has a delivery port 21 and a pressurizing port 22. The delivery port 21 is attached to the attachment mouthpiece 382 of the barrel attachment portion 380 and pumps liquid through the attachment mouthpiece 382 to the relay flow channel 383. The pressurizing port 22 receives the pumping gas described above. The barrel 20 pressurizes the liquid with pumping gas coming from the pressurizing port 22 and pumps the liquid through the delivery port 21, the attachment mouthpiece 382, the relay flow channel 383, the suction port 324, and the inlet flow channel 325 into the inlet 323.

(Control Device)

As shown in FIG. 10, the controller 30 has air circuitry 40 and control circuitry 50. The air circuitry 40 supplies the driving gas to the pump unit 10 and the pumping gas to the barrel 20. For example, the air circuitry 40 is connected to a gas source via an input hose 73, to the pressurizing port 481 in the pump unit 10 via an output hose 71, and to the pressurizing port 22 of the barrel 20 via an output hose 72.

The air circuitry 40 outputs a portion of gas (hereinafter referred to as "input gas") that flows in from the input hose 73, and output remaining portion of the input gas to the output hose 72 as the pumping gas. The air circuitry 40 has a regulator 41, an electropneumatic regulator 42, a valve 43, and pressure sensors 44, 45,46.

The regulator 41 reduces pressure of the input gas to a supply pressure of the driving gas and outputs it to the output hose 71 and the electropneumatic regulator 42. The electropneumatic regulator 42 further reduces the pressure reduced by the regulator 41 to a supply pressure of the pumping gas and outputs it to the output hose 72.

The electropneumatic regulator 42 changes the supply pressure of the pumping gas according to a control command. The valve 43 is, for example, a solenoid valve, and opens and closes a flow path between the electropneumatic regulator 42 and the output hose 72 according to a control command.

The pressure sensor 44 detects the pressure of the input gas prior to passing through the electropneumatic regulator 42. The pressure sensor 45 detects the pressure of the driving gas between the electropneumatic regulator 42 and the output hose 71. The pressure sensor 46 detects the pressure of the pumping gas between the electropneumatic regulator 42 and the valve 43.

The control circuitry 50 controls the air circuitry 40. The control circuitry 50 is also connected to the piston driver 480 via a cable 74 and controls the piston driver 480. For example, the control circuitry 50 has a pressure monitoring unit 51, a barrel pressure control unit 52, and a dispense control unit 53 as a functional elements (hereinafter referred to as a "functional block").

The pressure monitoring unit 51 adjusts the pressures applied by the barrel 20 to the liquid. For example, the pressure monitoring unit 51 switches between supplying and stopping the pumping gas by opening and closing the valve 43. The barrel pressure control unit 52 controls the electropneumatic regulator 42 to cause the supply pressure of the pumping gas to follow a target pressure. The target pressure is determined based on, for example, a setting input of a user. The setting input is acquired by an input device 66 that is described later. The dispense control unit 53 supplies the driving power to the piston driver 480 so as to repeat switching between the first state and the second state at a predetermined cycle at a predetermined period. For example, the dispense control unit 53 supplies the driving power to the piston driver 480 according to a dispense command from a host controller 80. The dispense command includes, for example, the predetermined cycle and the predetermined period.

Figure 11:
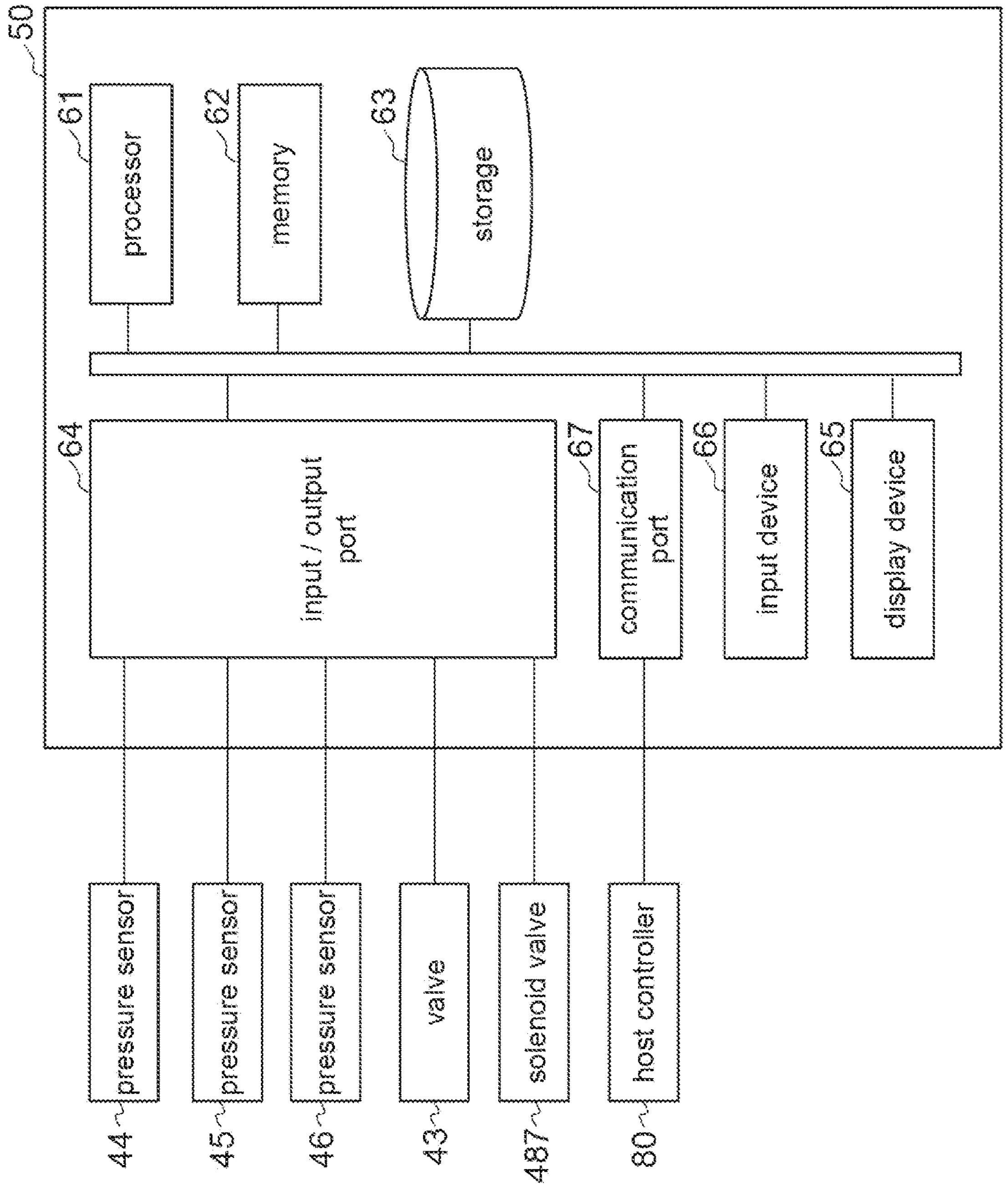
FIG. 11 is a schematic diagram illustrating an example hardware configuration of control circuitry.

FIG. 11 is a block diagram illustrating the hardware configuration of the control circuitry 50. As shown in FIG. 11, the control circuitry 50 includes a processor 61, a memory 62, a storage 63, an input/output port 64, a display device 65, the input device 66, and a communication port 67. Although one processor 61 is shown in the figure, the control circuitry 50 may have a plurality of processors 61. The control circuitry 50 may have the memory 62 and the storage 63 for each the processor 61.

The storage 63 may include one or more storage devices each of which include one or more non-transitory and computer-readable storage mediums, such as a nonvolatile semiconductor memory. The storage 63 stores a program for causing the control circuitry 50 to configure the functional blocks described above. The memory 62 may include one or more memory devises each of which temporarily stores the program loaded from the storage medium of the storage 63 and the calculation result by the processor 61. The one or more memory devices are, for example, a random access memory. The processor 61 may include one or more processing devices and configures the functional blocks of the control circuitry 50 by executing the program in cooperation with the memory 62. The input/output port 64 inputs and outputs electrical signals to and from the valve 43, pressure sensors 44, 45, 46 and the solenoid valve 487 in accordance with instructions from the processor 61. The display device 65 includes, for example, a liquid crystal panel or an organic EL panel, and displays an interface image in accordance with instructions from the processor 61. The input device 66 includes, for example, an input key and acquires an input (key input) to the input key. The display device 65 and the input device 66 may be integrated as a touch panel 33 (see FIG. 1). The communication port 67 performs information communication with the host controller 80 in accordance with instructions from the processor.

The control circuitry 50 may not be limited to one in which each function is configured by a program. For example, at least a part of the functions of the control circuitry 50 may be configured by a dedicated logic circuit or an application specific integrated circuit (ASIC) in which the dedicated logic circuit is integrated.

[Control Procedure]

Figure 12:
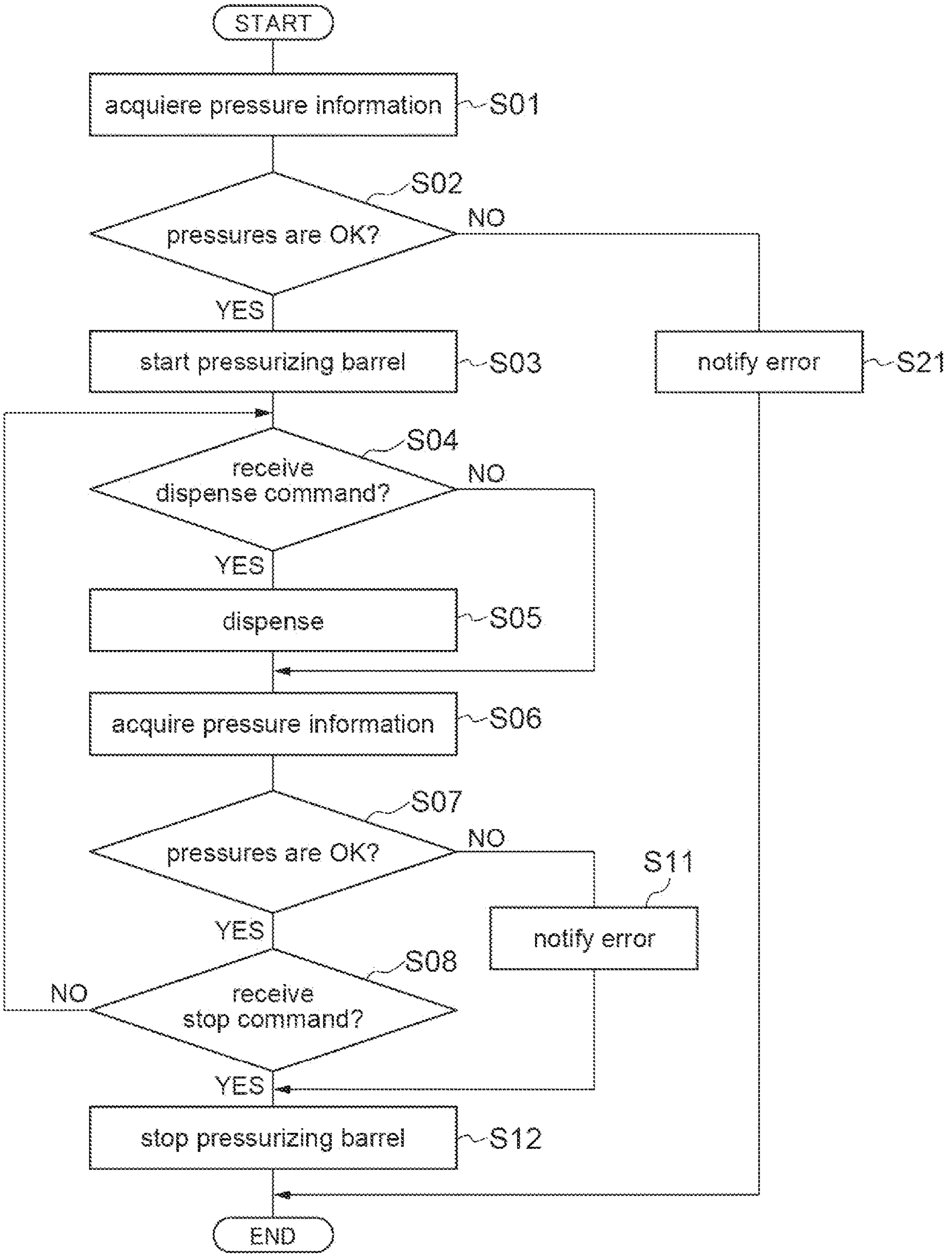
FIG. 12 is a flowchart illustrating an example control procedure by the control circuitry.

Hereinafter, a control procedure by the control circuitry 50 will be described. As shown in FIG. 12, the control circuitry 50 first executes operations S01 and S02. In the operation S01, the pressure monitoring unit 51 acquires the detection results of the pressures by the pressure sensors 44, 45, 46. In the operation S02, the pressure monitoring unit 51 checks whether the pressures detected by the pressure sensors 44, 45, 46 are within a normal range.

When it is determined that at least one of the detection results of the pressures in the operation S02 is not within the normal range, the control circuitry 50 performs a operation S21. In the operation S21, the pressure monitoring unit 51 notifies the host controller 80 of the error. The control circuitry 50 then terminates the control procedure.

When it is determined that the detection results of the pressures in the operation S02 is within the normal range, the control circuitry 50 executes operations S03, S04. In the operation S03, the barrel pressure control unit 52 opens the valve 43 to start the supply of pumping gas to the barrel 20. In the operation S04, the dispense control unit 53 checks whether or not there is a dispense command from the host controller 80 or the like.

When it is determined that there is the dispense command in the operation S04, the control circuitry 50 executes a operation S05. In the operation S05, the dispense control unit 53 supplies the driving power to the piston driver 480 so as to repeat dispense and suction of the liquid according to the dispense command.

Next, the control circuitry 50 performs operations S06, S07. If it is determined that there is no dispense command in the operation S04, the control circuitry 50 executes the operations S06, S07 without executing the operation S05. In the operation S06, the pressure monitoring unit 51 acquires the detection results of the pressures by the pressure sensors 44, 45, 46. In the operation S07, the pressure monitoring unit 51 checks whether the pressures detected by the pressure sensors 44, 45, 46 are within the normal range.

When it is determined that the detection results of the pressures in the operation S07 is within the normal range, the control circuitry 50 performs a operation S08. In the operation S08, the barrel pressure control unit 52 checks whether a control stop command is received from the host controller 80.

When it is determined that the control stop command is not received in the operation S08, the control circuitry 50 returns the processing to the operation S04. Thereafter, until an abnormality occurs in the detection results of the pressure sensors 44, 45, 46 or the control stop command is received from the host controller 80, the control of dispensing the liquid to the pump unit 10 according to the dispense command is repeated.

When it is determined that at least one of the detection results of the pressures in the operation S07 is not within the normal range, the control circuitry 50 executes a operation S11. In the operation S11, the pressure monitoring unit 51 notifies the host controller 80 of the error.

If it is determined that the control stop command is received in the operation S08, or after the operation S11, the control circuitry 50 executes a operation S12. In the operation S12, the barrel pressure control unit 52 closes the valve 43 and stops the supply of the pumping gas to the barrel 20. The control circuitry 50 then terminates the control procedure.

As described above, the dispenser 1 includes: a plunger 100 comprising a distal end surface 101 facing an advance direction and a proximal end surface 102 facing a retraction direction; a guide block 200 configured to guide an advance toward the advance direction and retraction toward the retraction direction of the plunger 100 along an axial line L1 intersecting the distal end surface 101 and the proximal; a dispensing portion 300 configured to dispense and suction liquid in response to the advance and the retraction of the distal end surface 101; a driver 400 configured to cause the plunger 100 to advance toward the advance direction and retract toward the retraction direction. The dispensing portion 300 includes: a surrounding portion 310 surrounding the distal end surface 101 of the plunger 100 about the axial line L1 to define an accommodation chamber 319; a nozzle unit 340 facing the distal end surface 101 of the plunger 100 along the axial line L1; and a plunger seal 352 facing the nozzle unit 340 so that the accommodation chamber 319 is located between the plunger seal 352 and the nozzle unit 340, and sealing between the surrounding portion 310 and the plunger 100. The nozzle unit 340 includes an outlet 343 opening into the accommodation chamber 319 to dispense the liquid out of the accommodation chamber 319. The surrounding portion 310 includes an inlet 323 opening into the accommodation chamber 319 to receive the liquid into the accommodation chamber 319. The inlet 323 is located closer to the nozzle unit 340 between the plunger seal 352 and the nozzle unit 340.

According to this dispenser 1, the inlet 323 is opened at the beginning of a period during which the plunger retracts (hereinafter referred to as a "retraction period"), so that liquid is rapidly suctioned into the accommodation chamber 319. In addition, since the opening areas of the inlet 323 are increased as the plunger 100 retracts, the liquid can be suctioned more quickly. Further, the opening areas of the inlet 323 become smaller as the plunger 100 advances in a period during which the plunger 100 advance (hereinafter referred to as "advance period"), the pressure from escaping to the inlet 323 can be suppressed and the liquid can be dispensed more quickly from the outlet 343. Therefore, dispensing may be sped up.

A distance from the inlet 323 to the nozzle unit 340 is less than or equal to half of a maximum stroke H1 of the distal end surface 101 of the plunger 100. Liquid can be suctioned more quickly.

More than half of the maximum stroke H1 of the distal end surface 101 of the plunger 100 may overlap the inlet 323 along the axial line L1. Liquid can be suctioned more quickly.

The nozzle unit 340 may further include: a dispense port 344 opening to outside of the accommodation chamber 319; and a dispense flow channel 345 connecting the outlet 343 and the dispense port 344 without passing through a check valve. Since there is no resistance of the check valve, the liquid can be dispensed more quickly. In addition, since the inlet 323 opens early when sucking the liquid, the liquid can be suppressed from being drawn into the outlet 343 even without the check valve.

The driver 400 may include: a cylinder 410 accommodating the plunger 100; a piston 450 partitioning an inside of the cylinder 410 into a first space 413 and a second space 414, configured to: advance the plunger 100 toward the advance direction according to a pressure of the first space 413; and retract the plunger 100 toward the retraction direction according to a pressure of the second space 414; and a piston driver 480 configured to switch between a first state in which a pressure of a pressurizing source is applied to the first space 413 and a second state in which the pressure of the pressurizing source is applied to the second space 414. Even when the driving power is not supplied due to a failure of the control system, the cylinder 410 can be held at the most advanced position as long as the pressurizing is continued, and leakage of the liquid from the outlet 343 can be suppressed. Therefore, both of an increase in dispensing speed and an improvement in reliability can be achieved.

The piston driver 480 may pressurize the first space 413 or the second space 414 by a pressure of a pressing source. The dispenser 1 may further include a spring 620 configured to apply a repulsive force to the plunger 100 toward the advance direction; and a release portion 440 configured to release, by the pressure of the pressurizing source, an application of the repulsive force from the spring 620 to the plunger 100. When the pressurizing source is supplied, the repulsive force applied to the piston 450 by the spring 620 may be released to allow the piston 450 to slide at high speed, and when the pressurizing source is not supplied, the plunger 100 may be maintained at the most advanced position by the repulsive force of the spring 620. Accordingly, leakage of the liquid from the outlet 343 can be more reliably suppressed.

The dispenser 1 may further comprise a barrel 20 configured to pump the liquid from outside the accommodation chamber 319 to the inlet 323; and a pressure monitoring unit 51 configured to adjust a pressure applied to the liquid by the barrel 20. The dispensing speed can be increased by optimizing the relationship between the pressurizing and depressurizing by the advance and retract of the plunger 100 and the pressurizing by the barrel 20.

As described above, the dispenser 1 includes: a plunger 100 comprising a distal end surface 101 facing an advance direction and a proximal end surface 102 facing a retraction direction; a guide block 200 configured to guide an advance toward the advance direction and retraction toward the retraction direction of the plunger 100 along an axial line L1 intersecting the distal end surface 101 and the proximal; a dispensing portion 300 configured to dispense and suction liquid in response to the advance and the retraction of the distal end surface 101; a cylinder 410 accommodating the plunger 100; a piston 450 partitioning an inside of the cylinder 410 into a first space 413 and a second space 414, configured to: advance the plunger 100 toward the advance direction according to a pressure of the first space 413; and retract the plunger 100 toward the retraction direction according to a pressure of the second space 414; a piston driver 480 configured to switch between a first state in which a pressure of a pressurizing source is applied to the first space 413 and a second state in which the pressure of the pressurizing source is applied to the second space 414; a spring 620 configured to apply a repulsive force to the plunger 100 toward the advance direction; and a release portion 440 configured to release, by the pressure of the pressurizing source, an application of the repulsive force from the spring 620 to the plunger 100.

According to this dispenser 1, when the pressurizing source is supplied, the repulsive force applied to the piston 450 by the spring 620 is released to enable high-speed sliding in the piston 450, and when the pressurizing source is not supplied, the plunger 100 can be held at the most advanced position by the repulsive force of the spring 620. Therefore, both high speed dispensing and reliability can be achieved.

The release portion 440 may form a third space 445 in the cylinder 410, so that the pressure of the pressurizing source is applied to the third space 445 in both the first state and the second state. The application of the repulsive force may be released by the pressure of the third space 445. The configuration of the release portion 440 can be simplified.

The piston 450 may have an annular shape and partitions the inside of the cylinder 410 into the first space 413 and the second space 414 between an outer peripheral surface of the plunger 100 and an inner peripheral surface of the cylinder 410. The spring 620 may apply the repulsive force to the piston 450 between the outer peripheral surface of the plunger 100 and the inner peripheral surface of the cylinder 410. By utilizing the space around the proximal end portion of the plunger 100 as the arrangement space of the spring 620 and the release portion 440, increase in size due to the addition of the spring 620 and the release portion 440 can be suppressed.

The dispenser 1 may further comprise a holder 461 holding the piston 450 on the outer peripheral surface of the plunger 100 while allowing the piston 450 to move in a direction vertical to the axial line L1. By the holder 461 that allows the axial line L1 to float the piston 450 in the vertical direction, both the position of the plunger 100 with respect to the guide block 200 and the position of the piston 450 with respect to the cylinder 410 can be optimized, and the speed of sliding of the piston 450 and the plunger 100 can be increased.

The driver 400 may further have an annular inner seal 472 sealing between the piston 450 and the plunger 100 while allowing the piston 450 to move in the direction vertical to the axial line L1. By sealing the piston 450 formed by the annular shape over the entire circumference, the first space 413 and the second space 414 may be firmly pressurized and the piston 450 may be driven at a higher speed.

The piston 450 may have an annular bottom surface 457 along a plane intersecting the axial line L1. The plunger 100 may have an annular rear surface 132 facing the bottom surface 457. The plunger seal 352 may contact the bottom surface 457 and the rear surface 132 to seal between the piston 450 and the plunger 100. By interposing the inner seal 472 between the bottom surface 457 and the rear surface 132, both the float property in the direction vertical to the axial line L1 and the seal property of the piston 450 can be achieved. In addition, since the inner seal 472 is interposed between the bottom surface 457 and the rear surface 132 over the entire circumference around the axial line L1, the place where the driving force acts between the plunger 100 and the piston 450 is dispersed over the entire circumference. As a result, the postures of both the plunger 100 and the piston 450 are stabilized, so that the plunger 100 and the piston can slide at higher-speed.

The dispenser 1 may further comprise a through bolt 11 for attaching the guide block 200 to the cylinder 410. The floatability of the piston 450 is more beneficial because the guide block 200 and the cylinder 410 are separate members from each other and a positional deviation of the cylinder 410 relative to the guide block 200 is likely to occur.

The dispenser 1 may further include a distal end surface 521 facing the proximal end surface 102 of the plunger 100 in the cylinder 410 to restrict the retraction of the plunger 100; and a retraction limit adjustment portion 530 configured to adjust the position of the distal end surface 521 in a direction along the axial line L1. The distal end surface 521 acts directly on the cylinder 410, and the most retracted position of the plunger 100 can be adjusted accurately.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A dispenser comprising:
- a plunger comprising a distal end surface facing an advance direction of the plunger and a proximal end surface facing a retraction direction of the plunger;
- a dispensing portion configured to dispense and suction liquid in response to an advance and a retraction of the distal end surface along an axial line intersecting the distal end surface and the proximal end surface;
- wherein the dispensing portion comprises:
  - a surrounding portion surrounding the distal end surface of the plunger about the axial line to define an accommodation chamber; and
  - an end portion facing the distal end surface of the plunger along the axial line, wherein the end portion comprises an outlet opening into the accommodation chamber to dispense the liquid out of the accommodation chamber,
- wherein the surrounding portion comprises an inlet opening into the accommodation chamber to receive the liquid into the accommodation chamber, and
- wherein a distance from the inlet to the end portion is less than or equal to half of a maximum stroke of the distal end surface of the plunger.

2. The dispenser according to claim 1, wherein the dispensing portion further comprises:
- a seal portion facing the end portion so that the accommodation chamber is located between the seal portion and the end portion, and forming a seal between the surrounding portion and the plunger, and
- wherein the distance from the inlet to the end portion is less than a distance from the inlet to the seal portion.

3. The dispenser according to claim 1, wherein more than half of the maximum stroke of the distal end surface of the plunger overlaps the inlet along the axial line.

4. The dispenser according to claim 1, wherein the end portion further comprises:
- a dispense port opening outside of the accommodation chamber; and
- a dispense flow channel connecting the outlet and the dispense port without passing through a check valve.

5. The dispenser according to claim 1, further comprising:
- a pump configured to pump the liquid from outside the accommodation chamber to the inlet; and
- a pressure adjuster configured to adjust a pressure applied to the liquid by the pump.

6. The dispenser according to claim 5, wherein the pressure adjuster is configured to adjust the pressure applied to the liquid by the pump so that an inverse flow of the liquid from the accommodation chamber to the inlet is prevented during the advance of the plunger, and a dispense of the liquid from the outlet is temporarily ceased during the retraction of the plunger.

7. The dispenser according to claim 1, further comprising:
- a cylinder accommodating the plunger;
- a piston partitioning an inside of the cylinder into a first space and a second space, and configured to:
  - advance the plunger toward the advance direction according to a pressure of the first space; and
  - retract the plunger toward the retraction direction according to a pressure of the second space; and
- a piston driver configured to switch between a first state in which a pressure of a pressurizing source is applied to the first space and a second state in which the pressure of the pressurizing source is applied to the second space.

8. The dispenser according to claim 7, further comprising:
- a spring configured to apply a repulsive force to the plunger toward the advance direction; and
- a release portion configured to release, by the pressure of the pressurizing source, an application of the repulsive force from the spring to the plunger.

9. The dispenser according to claim 8, further comprising a pusher configured to transmit the repulsive force from the spring to the plunger,
- wherein the release portion is configured to apply the pressure of the pressurizing source to the pusher toward the retraction direction to release the application of the repulsive force from the spring to the plunger.

10. The dispenser according to claim 9, wherein the release portion forms a third space in the cylinder, so that the pressure of the pressurizing source is applied to the third space in both the first state and the second state, and
- wherein the application of the repulsive force is released by the pressure of the third space.

11. The dispenser according to claim 10, wherein the first space is located between the second space and the third space along the axial line.

12. The dispenser according to claim 10, wherein the piston driver comprises:
- a pressurizing port pressurized by the pressurizing source; and
- a valve configured to switch between the first state in which the pressurizing port is connected to the first space and the second state in which the pressurizing port is connected to the second space, and
- wherein the third space is connected to the pressurizing port.

13. The dispenser according to claim 8, wherein the piston has an annular shape and partitions the inside of the cylinder into the first space and the second space between an outer peripheral surface of the plunger and an inner peripheral surface of the cylinder, and
- wherein the spring applies the repulsive force to the piston between the outer peripheral surface of the plunger and the inner peripheral surface of the cylinder.

14. The dispenser according to claim 7, wherein the piston has an annular shape and partitions the inside of the cylinder into the first space and the second space between an outer peripheral surface of the plunger and an inner peripheral surface of the cylinder, and
- wherein the dispenser further comprises a holder holding the piston on the outer peripheral surface of the plunger while allowing the piston to move in a direction vertical to the axial line.

15. The dispenser according to claim 14, further comprising a seal portion forming a seal between the piston and the plunger while allowing the piston to move in the direction vertical to the axial line.

16. The dispenser according to claim 15, wherein the piston has an annular first seal surface along a plane intersecting the axial line,
- wherein the plunger has an annular second seal surface facing the first seal surface, and the seal portion contacts the first seal surface and the second seal surface to form the seal between the piston and the plunger.

17. The dispenser according to claim 16, wherein the first seal surface faces the advance direction and the second seal surface faces the retraction direction.

18. The dispenser according to claim 17, wherein the plunger comprises a flange comprising the second seal surface and a restriction surface on an opposite side of the second seal surface, and wherein the holder holds the piston between the flange and the holder, and wherein the dispenser further comprises an advance restriction block configured to restrict the advance of the plunger by contacting the restriction surface.

19. The dispenser according to claim 14, further comprising:

a guide portion configured to guide the advance and the retraction of the distal end surface along the axial line; and a fastening member for attaching the guide portion to the cylinder.

20. The dispenser according to claim 14, further comprising:

a retraction restricting portion facing the proximal end surface of the plunger in the cylinder to restrict the retraction of the plunger; and a retraction limit adjustment portion configured to adjust a position of the retraction restricting portion in a direction along the axial line.

* * * * *